Aug. 28, 1951   F. PIERCE ET AL   2,566,247
PLOTTER
Filed June 14, 1945   3 Sheets-Sheet 1
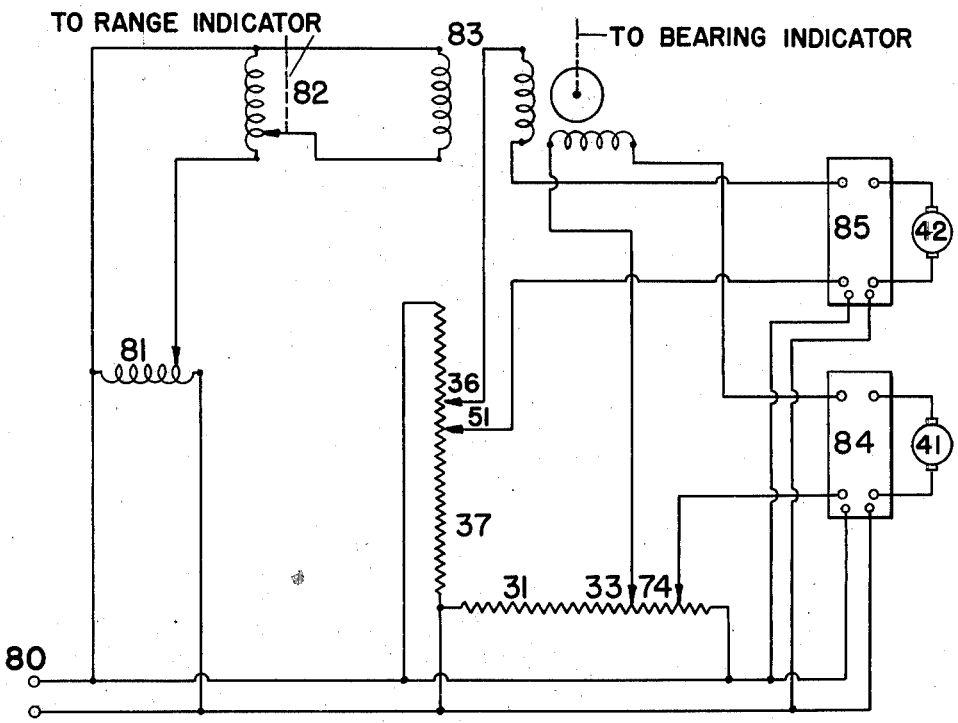
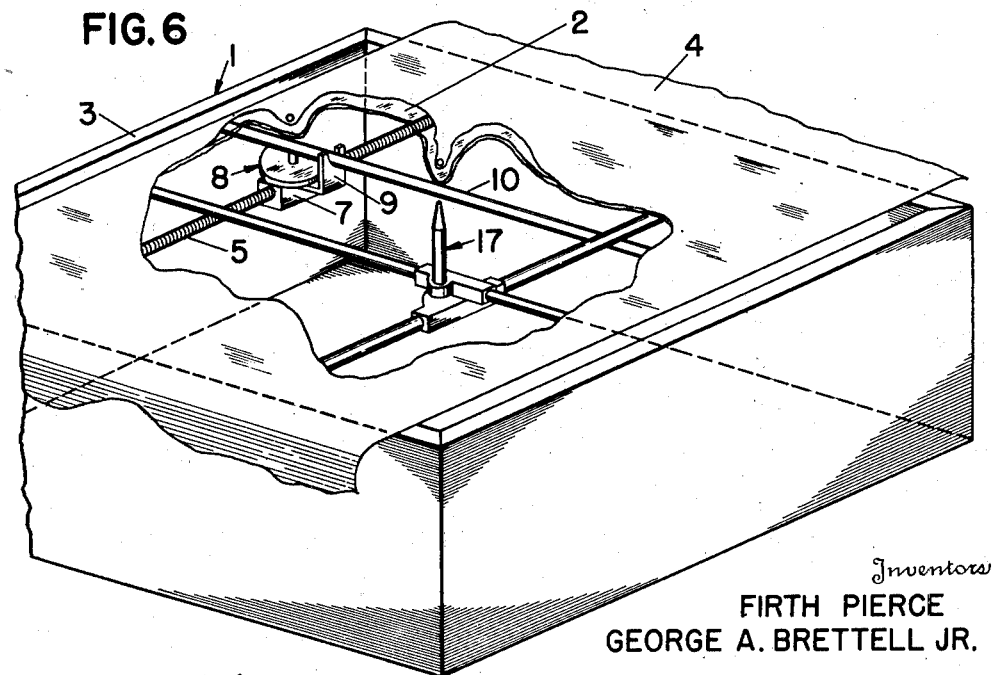
FIG. 1
Inventors
FIRTH PIERCE
GEORGE A. BRETTELL JR.
By Ralph L. Chappell
Attorney

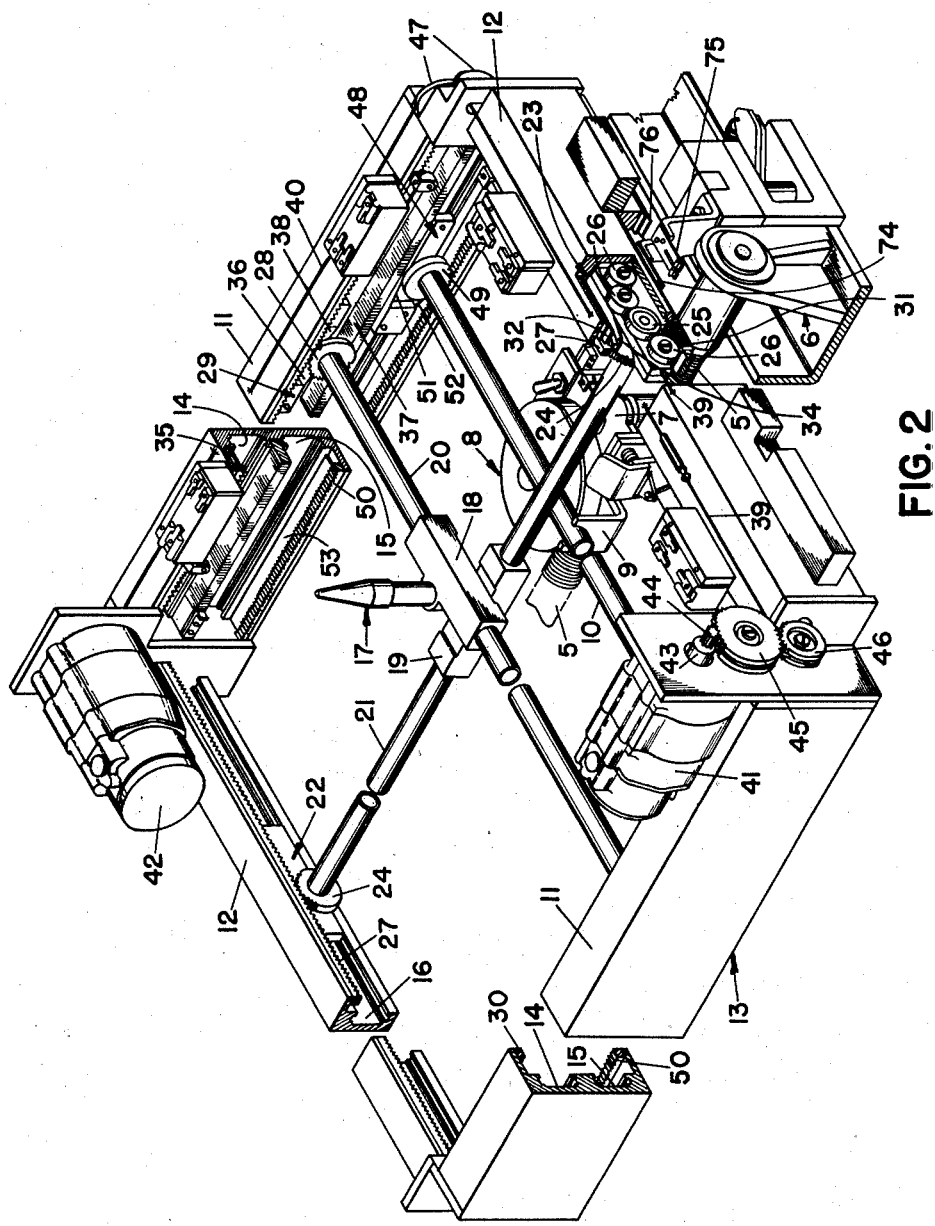

Aug. 28, 1951

F. PIERCE ET AL 2,566,247

PLOTTER

Filed June 14, 1945

Inventors
FIRTH PIERCE
GEORGE A. BRETTELL JR.

By Robert L Chappell

Attorney

Patented Aug. 28, 1951

2,566,247

UNITED STATES PATENT OFFICE 2,566,247

PLOTTER

Firth Pierce and George A. Brettell, Jr., San Diego, Calif., assignors to the United States of America as represented by the Secretary of the Navy Application June 14, 1945, Serial No. 599,502

13 Claims. (Cl. 33—1)

This invention relates to plotting mechanisms and more particularly to those of a type where ranges and bearings to given objects are available from which it is desired to plot the positions and movements of said objects.

The most important use for plotters of this type has been at sea where radar and/or sonar gear provide ranges and bearings of friendly and enemy ships and aircraft. Under all conditions where these factors are obtained, it is also usually of interest to maintain a continuous plot of the movements of all other vessels and aircraft for assistance in tactical maneuvers and navigation.

In the past, in order to study the movements of other ships, aircraft, etc., which herein will be called targets, it has been customary to receive oral information of ranges and bearings and plot the position of the target relative to the position of the ship on which the gear was mounted by means of a drafting machine. This method, involving the use of a Dead Reckoning Tracer, (DRT) was slow and subject to many errors and inaccuracies. The present invention is a mechanism for use with portions of the DRT equipment, and not only provides means for quickly plotting the positions of targets, but eliminates many of the errors connected with the use of the older plotting methods.

Before describing the present invention, a word should be said concerning the DRT, which is well known in the art. It comprises, in general, a glass-topped table over which is laid a thin sheet of plotting paper on which a plot is made. A compass-rose, representing the position at which the plot is made, which, herein, will be called own ship, is supported just under the glass top by a positioning mechanism which moves the compass-rose in a manner determined by the movements of the ship. This mechanism usually comprises a frame mounted on a lead screw for supporting the rose. The lead screw extends the width of the plotting table and its ends are mounted in a pair of supports which are arranged to be driven along a pair of parallel rails to produce one component of motion. The lead screw is rotated to drive the compass-rose frame in a perpendicular direction, which latter motion provides the perpendicular component of motion. It is thus seen that the compass-rose may be made to travel under the glass top in a path similar (but to a smaller scale) to the path of the ship on which it is mounted, if the components of the ship's motion are applied to these mechanisms. A light is placed under the rose and its position is thus projected on the plotting paper above. As ranges and bearings of targets are obtained, they are manually plotted on the paper, relative to the position indicated by the rose.

The present invention utilizes the traveling mechanism of the DRT with the compass rose removed. A light source and lens is substituted on the compass-rose frame and focuses a small spot of light perpendicularly upward to the plotting paper and this light spot represents own ship. In addition, another light source is included which projects a second light spot on the paper, which latter represents the position of the target. Thus, by marking the plotting paper at intervals as the light spots move across it, traces of the motions are obtained.

In the drawings:

Fig. 1 is a perspective view of the plotter, with portions cut away to show its method of operation with the DRT.

Fig. 2 is a detailed isometric drawing showing the framework and its relation to the moving light sources.

Fig. 6 is a schematic diagram of the electrical circuit.

Figure 5:
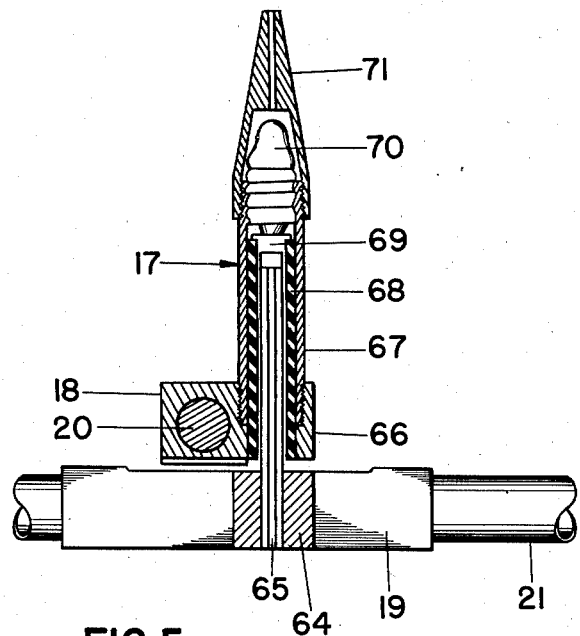
Fig. 5 is a sectional view showing the construction of the light source which indicates the position of the target.

The DRT in general use is housed in a rectangular box 1, shown in Fig. 1. The box is covered with a glass plate 2 held in position at its edges by brackets 3. A sheet of plotting paper 4 is placed over the glass plate on which the movements of the vessels are plotted. Beneath the glass top 2 is ordinarily mounted a lead screw 5, mounted in end supports 6 which are designed to travel along a pair of rails (not shown).

A travelling block 7 is mounted on the lead screw and which, in the conventional DRT, supported the compass rose. In the present invention, however, this block supports a light source, generally designated 8, and which will subsequently be described in detail. It is noted, however, that this source is arranged to project a light spot vertically upward, through the cover plate 2 and onto the plotting paper 4. It is obvious that this spot may be made to appear at any point on the paper by utilizing the existing DRT drive which provides one component of motion by turning the lead screw 5 and the other component by moving the lead screw 5 and end supports 6 along the parallel rails.

The present invention, in addition to adding the light source 8 to the lead screw, utilizes the mechanism shown in Fig. 2. It is seen that the sliding block 7 is provided with a U-shaped bracket 9 which receives a tubular guide rod 10. The ends of rod 10 are supported in the opposite guide sections 11, in a manner to be described, which sections, together with perpendicular sections 12, comprise the framework 13 of the machine. As can be seen from Fig. 2, guide sections 11 are formed with upper and lower channels, as at 14, 15, while guide sections 12 are formed with a single channel, as at 16.

In a plane just above the plane of motion of light source 8, a second light source, generally designated 17, is mounted for movement. Parenthetically, it is noted that this light source represents the target while the light source 8 represents the ship on which the gear is mounted. The light source 17, which will subsequently be described in detail, is mounted on a pair of sliding blocks 18, 19 which are supported by a pair of guide rods 20, 21, whose ends are supported in guide sections 11, 12.

The mechanism for supporting the ends of rods 10, 20, 21 is generally the same but will be described in detail for rod 21. As can be seen in Fig. 2, the ends of the rod are supported by a pair of carriages 22, 23 and a pair of pinions 24. The carriages are arranged to operate in channels 16 in the guide sections 12 and are provided with bearings 25 for supporting an extension of rod 21. In addition, three guide rollers 26 are mounted on the carriages to guide and position the carriages properly within the channels. Further, and to give positive and equal motion to the carriages, each of the channels is provided with a rack 27 with which the pinions 24 are arranged to engage.

Guide rod 20, perpendicular to rod 21, is provided with supporting means identical to that used in connection with rod 21. The pinions 28 and the carriages 29 (only one of each of which can be seen) are arranged to move in channels 14 of guide sections 11. (It should be noted that the carriage which cannot be seen and which is associated with rod 20, is identical with carriage 22.) The channels 14 are similarly provided with racks 30 for engagement by pinions 28.

One of the guide sections 12 is provided with a centrally positioned potentiometer 31, which extends the substantial length of the section; and also with a longitudinal, electrical conductor 32, positioned in the upper face of channel 16. Carriage 23 is provided with a pair of brushes 33, 34 which are connected together and insulated from the carriage and which contact potentiometer 31 and conductor 32, respectively. It is thus seen that by this arrangement, the potential of conductor 32 is maintained equal to the voltage taken off the potentiometer by brush 33.

Carriage 29 which supports one end of rod 20 has a similar arrangement with another brush (not shown), similar to brush 34, contacting a conductor 35 mounted in the upper portion of channel 14 in guide section 11. Another brush 36 is mounted on the carriage and contacts a second potentiometer 37 arranged between channels 14 and 15 in section 11, in a manner similar to potentiometer 31.

In addition to the brushes already described, carriage 23 and one of the carriages 29 (which can be seen in Fig. 2) each support a brush 38 which contacts the extensions of the rods 20, 21, for a purpose to be described.

These same two carriages 23, 29 are driven through two conducting cables 39, 40 by means of servomotors 41, 42, respectively, mounted conveniently on the framework. The mechanism for accomplishing this is the same for each carriage but will be described here for only one system. Motor 41 is connected by means of a shaft 43 to drive pinion 44 which, in turn, engages idler gear 45. This latter gear engages a third gear 46, which latter gear is positioned at the end of channel 16, and both gears 45, 46 are provided with a central slot as shown in Fig 2. At the opposite end of the channel, in a similar position, is an idler pulley 47 and the cable 39 thus extends from one end of carriage 23, through the end wall of the channel, around pulley 47, back over guide section 12, around the central slot in gear 46, through the other end wall of the channel, and along the channel for attachment to the opposite end of the carriage. In this manner the motors 41, 42 cause movement of carriages 23, 29 (and, consequently, through guide rods 21, 20, the light source) in directions determined by their rotation.

This mechanical arrangement is completed by the provision of carriages 48 at the ends of rod 10 resting in the U-shaped bracket 9 associated with light source 8. These carriages and their associated pinions 49 are arranged to operate in the lower channel 15 of guide section 11 in conjunction with rack 50. The carriage 48 which can be seen in Fig. 2 is provided with two brushes 51, 52 (identical with brushes 33, 34 on carriage 23) and which contact the under side of potentiometer 37, heretofore described, and another longitudinal conductor 53 mounted in the lower side of channel 15.

Figure 4:
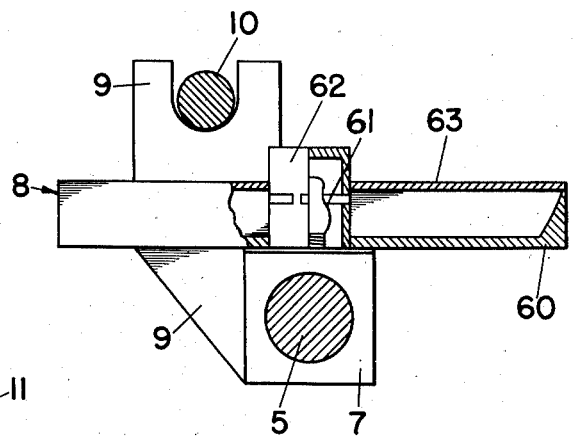
Fig. 4 is a sectional view showing the construction of the light source which indicates the position of own ship.

The light sources 8, 17 are shown in detail in Figs. 4, 5. Light source 8 (Fig. 4) is seen to comprise a dish-shaped reflector 60 situated on the support 7. Since this portion of the conventional DRT is provided with electric terminals (not shown) these are connected to a small light globe 61 mounted in the center of the reflector which may be several inches in diameter. In order that the reflected light may be confined to a narrow planar section, the globe is surrounded by a housing 62 which is formed with a narrow slit extending, except for short support sections, entirely around its circumference and which allows the light to be reflected upwardly when it strikes the reflector. It is thus seen that light from a 360° arc is applied to the spot and a partial interference caused by the passage of rods 20, 21 or light source 7 over this reflector will not cut off all of the light reflected upward to the paper. Thus, regardless of the relative positions of the two light sources, one does not interfere with or cut off the other. The surface of reflector 60 is preferably made a portion of an ellipsoid, with the foci of the ellipse located at the center of the globe and at the point on the plotting paper above and on which the spot is designed to be reflected. The reflector may, if it is desired, be covered with a colored glass plate 63 to differentiate the spot produced by this source and source 17.

Light source 17, shown in detail in Fig. 5, as is now clear may be moved to any desired spot under the plotting paper 4 by laterally moving guide rods 20, 21. As can be seen in the figures, the block 19 which engages rod 21 is provided with an extension 64 which is drilled to receive a hollow pin 65 (which may be held in place by any convenient means). Block 18 on rod 20 is formed with a similar extension 66. This latter extension is bored and counter bored to receive a tubular housing 67 which surrounds an insulating sleeve 68. Sleeve 68 supports, inwardly of itself, a hollow metal cap 69 into which pin 65 on block 19 extends.

The upper end of housing 67 is both internally and externally threaded and supports internally a small light globe 70, whose center contact rests on the top of cap 69. The external threads receive a hollow conical cap 71 which serves to project the light upwardly to the paper in a small spot.

Figure 3:
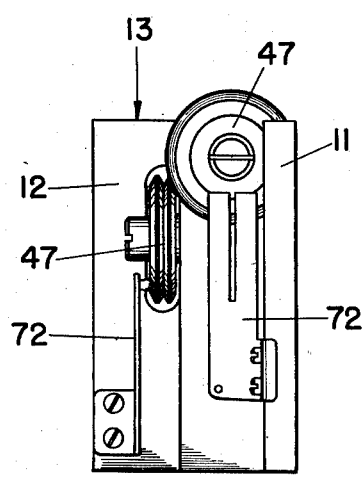
Fig. 3 is a partial elevation of the framework showing the brushes applied to the pulleys which drive the carriages.

The guide rods 20, 21 in practice are spaced from one another sufficiently to bring blocks 18, 19 closely adjacent but not in contact with each other. The terminals on the globe 70 are so arranged, as can be seen, that if a voltage is applied across the guide rods 20, 21, the globe will be lighted. Such a voltage is applied to the terminals of the globe through brushes 38 on carriages 28, 29. For convenience, this voltage is applied to the carriages and brushes through the cables 39, 40 by means of a pair of brushes 72 which bear on pulleys 47, as shown in Fig. 3.

Before entering into a discussion of the operation of the invention, it is to be noted that one of the supports 6 which mount the lead screw 5 on the DRT provides a conductor 73 and a pair of brushes 74, 75. These brushes are positioned so as to contact the under side of potentiometer 31 in guide section 12 and longitudinal conductor 76, mounted on the under side of guide section 12, respectively, as shown in Fig. 2. It is thus seen that each of the potentiometers 31, 37 is engaged by a pair of brushes (33, 74 and 36, 51, respectively).

Looking downward on the plotter, the light sources 8, 17 represent own ship and target positions. Thinking in terms of Cartesian coordinates, it is seen that the position of light source 17 with respect to light source 8 may be defined by its distance and bearing from the latter, or in terms of the components of such distance where the potentiometers 31, 37 are assumed to lie in the axes of a Cartesian coordinate system.

It can further be seen that, since the potentiometers are linear devices, the potential differences between brushes 36 and 51 on potentiometer 37 and between brushes 33 and 74 on potentiometer 31 are proportional to such components of the distance between the two light sources. Since these potential differences between the brushes of the two pairs are arranged to be obtained at any convenient points on the conductors 32, 35, 53, 76, it becomes clear that these voltage values are useful quantities. Since the purpose of the invention is to mtaintain the light sources in proper relationship, these voltage components may be effectively continuously compared to similar quantities obtained from the radar or sonar gear with which the device is operated and which latter quantities represent the actual values of distance components between own ship and target.

If after such a comparison process is accomplished, there appears a difference in the voltage components, this difference, in proper sense, may be applied to the motors 41, 42 which will be effective in altering the voltages intercepted on the potentiometers until they equal those representing the actual values, with which they are to be compared.

The electrical circuit which accomplishes this function is shown in the schematic diagram of Fig. 6. The line voltage is supplied at terminals 80 and is applied through an autotransformer 81 with a continuously variable ratio to a similar unit 82. The output of transformer 82 is, in turn, applied to a control transformer 83, which comprises a motor type structure with a rotating secondary winding. In this particular type used here, the primary is a single-phase winding and the secondary is a two-phase winding. By means of autotransformer 82, any desired voltage may be applied across the primary of the control transformer 83 and in practice, the magnitude of this voltage is chosen equal to the range from own ship to the target. The control transformer 83, similarly, has means for rotating the secondary through any desired angle which, in practice, will be the angle (with respect to a reference) which the target bears from own ship. Thus the two secondary windings will supply the sine and cosine components of the range voltage for comparison with the voltages proportional to the Cartesian coordinates obtained from the potentiometers 31, 37 which are connected directly across the line voltage. It has been made clear that for any given relative positions of light source 8 (own ship) and light source 17 (target), the potential difference between brushes 36 and 51 and brushes 33 and 74, as they contact potentiometers 37, 31, respectively, are proportional to the Cartesian coordinate components of the distance between said sources.

The voltage components obtained from the secondary windings of the control transformer 83 are added to the respective components obtained from the potentiometers and applied, through a pair of servo-amplifiers 84, 85 to drive servomotors 41, 42.

The operation of this circuit can best be understood by thinking of the voltages as D. C. (they are, of course, A. C.). If the voltages obtained from the secondary windings of the control transformer (which, as has been shown, are proportional to the Cartesian components of the actual range to the target) are added (in opposite sense) to the voltages obtained from the potentiometers, it is seen that the sums are applied to the amplifiers to drive the motors in direction dependent upon their signs. Thus, only if the sum is zero, indicating that the two portions of the voltage are equal but opposite in sign, will there be no voltage applied to the amplifier and, in turn, to the motor. If the voltages do not add to zero, rotation of the motors, through the gears and cables heretofore described, causes a re-orientation of the light source 17, until the voltages intercepted by the two pairs of brushes equals the voltage components obtained from the windings of the control transformer 83.

The above theory of operation is somewhat complicated by the obvious necessity for using A. C. To overcome these new complications, the servo-amplifiers 84, 85 are arranged to determine the sense (i. e., positive or negative) of the sum of the two voltages by phase comparison means. Such arrangements are well-known, but require the application of the line voltage to the amplifiers for comparison purposes as shown in Fig. 6. Otherwise, operation takes place in the same manner as described above, where D. C. operation was assumed.

It remains to be said that the settings on autotransformer 82 and control transformer 83 may be made manually or automatically. In practice the indicating arms of the transformers 82, 83 are directly coupled to the range and bearing indicators on the radar or sonar gear with which the present invention is associated. In this manner, since the DRT mechanism provides movement for light source 8, corresponding to own ship movement, and the ranges and bearings from own ship to target are thus automatically applied to the plotter, the positions of the light sources (and the spots) represent the positions of own ship and target at all times.

It remains only to note that autotransformer 81 provides means for choosing the scale on which the plotting is done. Thus, any portion of the line voltage may be used and the scale reduced or expanded as desired. It is also apparent that since both electrical systems under comparison are supplied from the terminals 80, fluctuation in the line voltage will produce no substantial error in the positioning of the light sources.

Having described our invention, we claim:

1. A plotter for plotting the path of a moving object comprising: a reference point, arranged and adapted to represent the position of an object; an indicator, mounted for movement with respect to said point, arranged and adapted to continuously represent the position of a moving object; a substantially linear potentiometer, connected to a voltage source, arranged and adapted to represent an axis of a Cartesian coordinate system; contact means associated with said indicator and continuously moving along said potentiometer as said indicator moves, another contact means associated with said reference point also contacting said potentiometer, both of said means contacting said potentiometer at points determined by the positions of said indicator and said reference point; driving means for re-orienting said indicator; means for utilizing the potential difference between said two contact means to operate said driving means.

2. A plotter for plotting the path of a moving object comprising: a reference point, arranged and adapted to represent the position of an object; an indicator, mounted for movement with respect to said point, arranged and adapted to continuously represent the position of a moving object; a pair of substantially linear potentiometers, connected to a common voltage source, arranged and adapted to represent the axes of a Cartesian coordinate system; separate contact means associated with said indicator and said reference point for contacting said potentiometers at points determined by the positions of said indicator and said reference point driving means for re-orienting said indicator; means for utilizing the potential difference between the points on each of said potentiometers to operate said driving means.

3. A plotter for plotting the paths of two moving objects comprising; a pair of indicators, mounted for independent movement, each arranged and adapted to represent the position of one of said objects; a substantially linear potentiometer, connected to a voltage source, arranged and adapted to represent an axis of a Cartesian coordinate system; contact means, associated with each of said indicators, contacting said potentiometer at points determined by the positions of said indicators; driving means for re-orienting one of said indicators; means for utilizing the potential difference between said contact means to operate said driving means.

4. In the device described in claim 3, one of said indicators comprising a light source; a dish-shaped reflector, positioned around said source; and a housing for said source limiting the passage of light to the sides of said reflector.

5. A plotter for plotting the paths of two moving objects comprising: a pair of indicators, mounted for independent movement, each arranged and adapted to represent the position of one of said objects; a pair of substantially linear potentiometers connected to a common voltage source, arranged and adapted to represent the axes of a Cartesian coordinate system; separate contact means associated with each of said indicators, contacting said potentiometers at points determined by the positions of said indicators; driving means for re-orienting one of said indicators; means for utilizing the potential difference between the points on each of said potentiometers to operate said driving means.

6. In the device described in claim 5, one of said indicators comprising a light source; a dish-shaped reflector, positioned around said source; and a housing for said source limiting the passage of light to the sides of said reflector.

7. A plotter for plotting the path of a moving object with respect to a second object comprising: a reference point, arranged and adapted to represent the position of said second object; an indicator, arranged and adapted to continuously represent the position of said object; a substantially linear potentiometer, connected to a voltage source, arranged and adapted to represent an axis of a Cartesian coordinate system; means for obtaining the difference in potential along said potentiometer determined by the respective component of distance between said reference point and said indicator along said axis; driving means for re-orienting said indicator; means for utilizing said difference in potential to operate said driving means.

8. A plotter for plotting the path of an object moving with respect to a second object comprising; a reference point, arranged and adapted to represent the position of said second object; an indicator, arranged and adapted to represent the position of said object; a pair of substantially linear potentiometers, connected to a common voltage source, arranged and adapted to represent the axes of Cartesian coordinate systems; means for separately obtaining the differences in potential along said potentiometers determined by the respective components of distance between said reference point and said indicator along said axes; driving means for re-orienting said indicator; means for utilizing said differences in potential to operate said driving means.

9. A plotter for plotting the path of an object moving with respect to a second object comprising: a reference point, arranged and adapted to represent the position of said second object; an indicator, arranged and adapted to represent the position of said object; a substantially linear potentiometer, connected to a voltage source, arranged and adapted to represent an axis of a Cartesian coordinate system; means for obtaining the difference in potential along said potentiometer determined by the component of distance between said reference point and said indicator along said axis; driving means for re-orienting said indicator; means for obtaining the difference in magnitude between said difference in potential and a difference in potential representing the actual component of distance between said object and said second object; means for utilizing said difference between said potential differences to operate said driving means.

10. A plotter for plotting the path of an object moving with respect to a second object comprising: a reference point, arranged and adapted to represent the position of said second object; an indicator, arranged and adapted to represent the position of said object; a pair of substantially linear potentiometers, connected to a common voltage source, arranged and adapted to represent the axes of a Cartesian coordinate system; means for obtaining the differences in potential along said potentiometers determined by the respective components of distance between said reference point and said indicator along said axes; driving means for re-orienting said indicator; means for obtaining the differences between the respective ones of said differences in potential and respective differences in potential representing the actual components of distance between said object and said second object; means for utilizing said differences between said potential differences to operate said driving means.

11. A plotter for plotting the path of a continuously moving object with respect to a second object comprising a reference point arranged and adapted to represent the position of said second object, an indicator adapted to represent the position of said first object, means for receiving signals indicative of the true range and bearing of the first object with respect to the second, a plurality of substantially linear potentiometers connected to a common voltage source and adapted to represent the axes of Cartesian coordinate systems, means for separately obtaining the differences in potential along said potentiometers determined by the respective components of distance between said reference point and said indicator along said axes, driving means for re-orienting said indicator, and means for utilizing any variations between said difference potentials and said aforementioned range and bearing signals to operate said driving means.

12. A plotter for plotting the paths of two moving objects comprising a pair of indicators mounted for independent movement, each of said indicators adapted to represent the position of one of said objects, means for receiving signals indicative of the range and bearing between said objects, a plurality of substantially linear potentiometers connected to a common voltage source and arranged and adapted to represent the axes of Cartesian co-ordinate systems, separate contact means associated with each of said indicators for contacting said potentiometers at points determined by the positions of said indicators, means for separately obtaining the differences in potential along said potentiometers determined by the respective distances between the contact means along said axes, driving means for reorienting one of said indicators, and means for utilizing any variations between said difference potentials and said aforementioned range and bearing signals to operate said driving means.

13. In the device described in claim 12 wherein the two indicators are sources of light, one of which comprises a light source positioned within and surrounded by a dish-shaped reflector and having a housing for limiting the passage of light to the sides of the reflector.

FIRTH PIERCE.
GEORGE A. BRETTELL, Jr.

REFERENCES CITED

The following references are of record in the file of this patent:

UNITED STATES PATENTS

| Number | Name | Date |
|---|---|---|
| 1,433,070 | Conners | Oct. 24, 1922 |
| 1,437,400 | Conners | Dec. 5, 1922 |
| 1,743,781 | Ford | Apr. 8, 1930 |
| 1,985,265 | Smith | Dec. 25, 1934 |
| 2,063,534 | Wallace | Dec. 8, 1936 |

FOREIGN PATENTS

| Number | Country | Date |
|---|---|---|
| 14,379 | Great Britain | Mar. 13, 1915 |
| 384,971 | Great Britain | Mar. 6, 1931 |
| 458,274 | Great Britain | Dec. 16, 1936 |